March 4, 1924.
O. KÖHLER
1,485,509
APPARATUS FOR COUPLING TRACTORS TO TRAILERS
Filed July 7, 1921 3 Sheets-Sheet 1
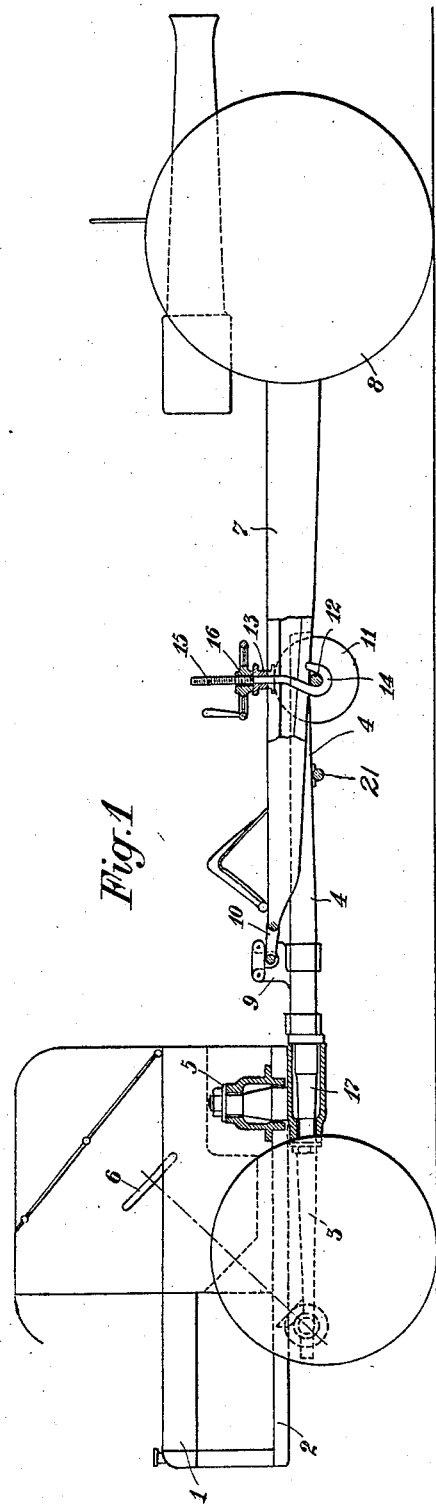
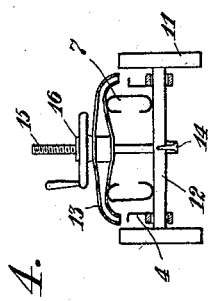
Inventor
O. Köhler,
By Marks & Clerk
Attys.

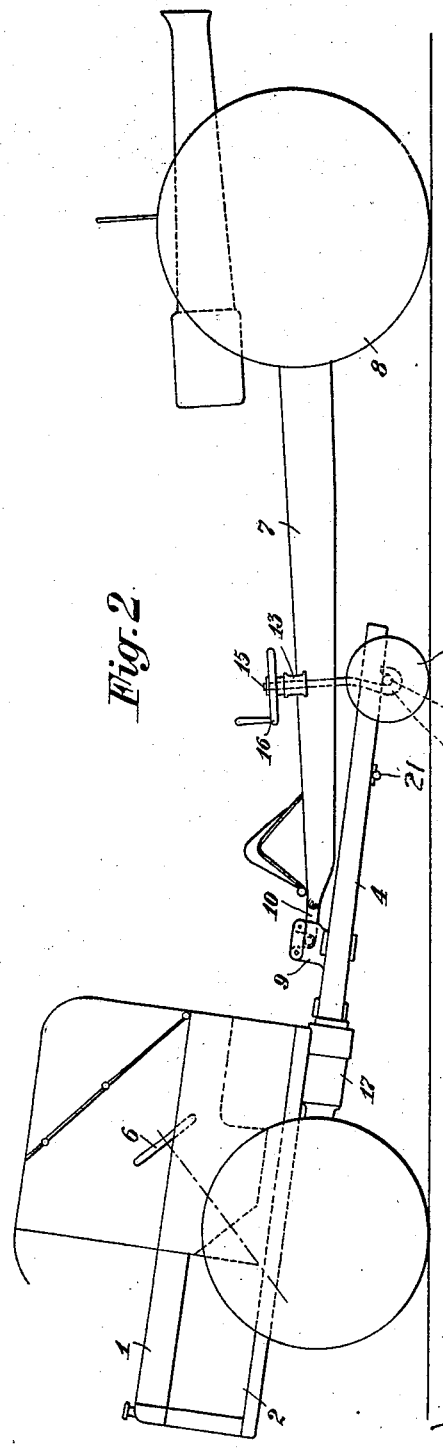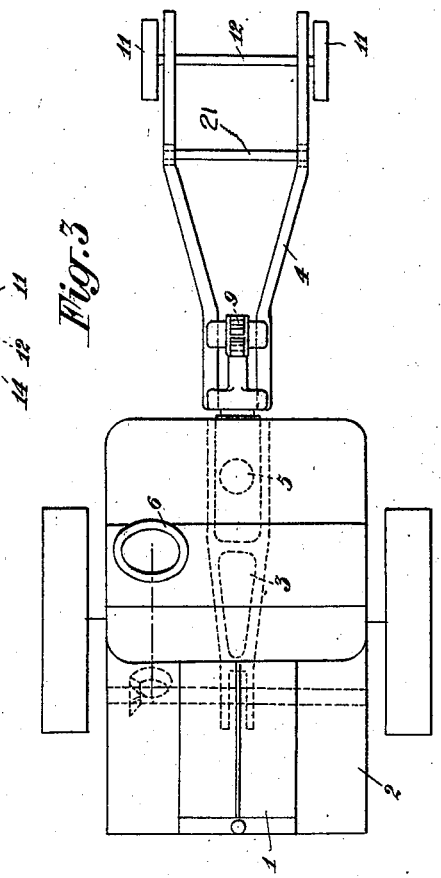

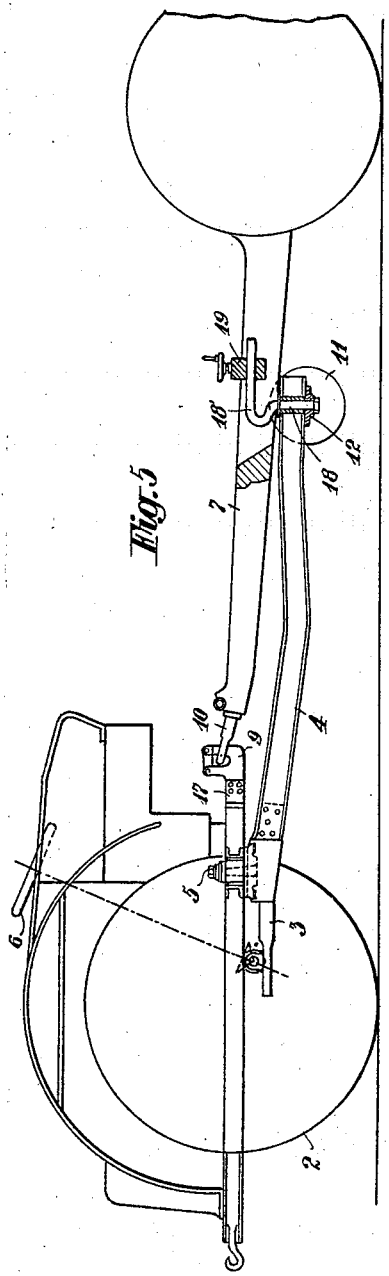
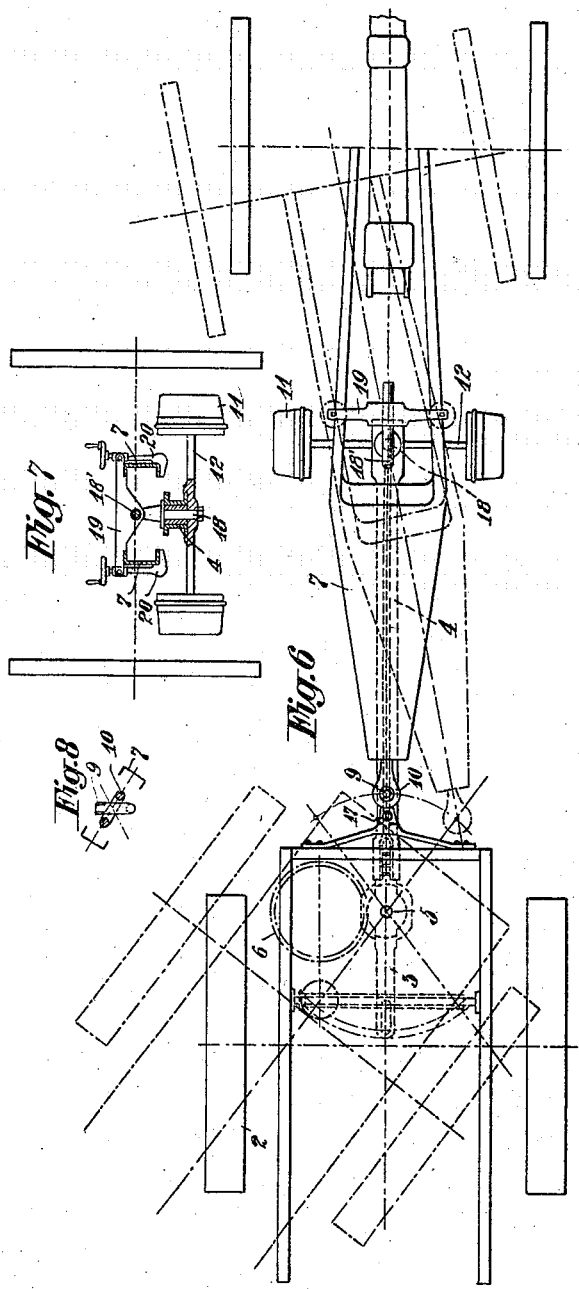

Patented Mar. 4, 1924.

1,485,509

UNITED STATES PATENT OFFICE.

OTTO KÖHLER, OF VIENNA, AUSTRIA, ASSIGNOR TO OESTERREICHISCHE DAIMLER MOTOREN AKTIENGESELLSCHAFT, OF WIENER-NEUSTADT, AUSTRIA.

APPARATUS FOR COUPLING TRACTORS TO TRAILERS.

Application filed July 7, 1921. Serial No. 483,047.

*To all whom it may concern:*

Be it known that I, OTTO KÖHLER, a citizen of the German-Austrian Republic, residing at Daimler Villa, Wr. Neustadt, Vienna, Austria, have invented certain new and useful Improvements in Apparatus for Coupling Tractors to Trailers (for which applications have been filed in the following countries: Austria, filed May 13, 1918, granted December 27, 1920, under Number 84,362; filed May 28, 1918, granted December 27, 1920, under Number 84,363; Germany, filed July 24, 1918, granted April 24, 1920, under Number 325,622; filed July 24, 1918, granted Aug. 26, 1919, under Number 316,061; Czechoslovakia, filed June 9, 1920, granted May 31, 1922, under Number 8,653; Czechoslovakia, filed Sept. 11, 1920, granted May 31, 1922, under Number 8,655; France, filed June 18, 1920, granted Dec. 17, 1920, under Number 517,440; Great Britain, filed June 21, 1920, granted June 9, 1921, under Number 145,485; Hungary, filed June 23, 1920, granted April 25, 1921, under Number 79,918), of which the following is a specification.

This invention relates to an improved apparatus for coupling a tractor to a trailer, more particularly of the kind wherein a two-wheeled tractor is provided with a steering and coupling arm, capable of swivelling horizontally, about which arm the tractor is swivelled for steering the trailer, likewise two-wheeled, being provided with a forwardly extending coupling arm.

The coupling of this type of vehicle has hitherto been difficult, the vehicles requiring to be brought together in such a manner, that the coupling arms will lie in one direction and the said arms must then be raised to the horizontal, for the purpose of coupling up.

These drawbacks are removed according to the present invention, by coupling the tractor to the trailer by means of an articular connection capable of allowing the tractor and trailer to be swiveled relatively to one another at least laterally and a rearwardly arranged fastening device for connecting the two coupling arms together. The articular connection enables the connection of the two vehicles in any position of the coupling arms relative to each other, whereupon the two connecting arms are brought into alignment by manœuvering the tractor. To effect this connection, it is only necessary to raise the connecting arm of the trailer a little, while that of the tractor still lies upon the ground. The fastening device, at the same time, acts favourably as lifting apparatus for both coupling arms until they are finally joined up. The lower part of the clamping device may be provided with wheels, which can act as trailing wheels for the tractor.

Two constructional forms of this apparatus are illustrated in the drawings by way of example, for the connection of a two-wheeled motor tractor with a gun.

Figs. 1 and 2 are side elevations, in the wholly and semi-coupled states, respectively of one constructional form, and Fig. 3 is a plan view of the tractor. Fig. 4 shows the clamping device in front elevation.

The two-wheeled tractor 2 fitted with a motor 1 has a two-armed steering and coupling member 3, 4 which is capable of swivelling in a horizontal direction about the vertical pin 5. The arm 3 is actuated by the steering mechanism 6 and the arm 4 is for connection with the trail 7 of the gun 8. The arm 4 is formed as a kind of frame and capable of swivelling about a horizontal longitudinal pin 17, so that both vehicles when coupled can accommodate themselves to irregularities of the ground.

The coupling apparatus comprises an articular connection, which may be constituted for example, as a latch hook 9 on the arm 4, to which the eye 10 fitted to the trail 7 is adapted to be hooked. This hooking up can take place at various positions of the connecting arms 4 and 7 and for this purpose only a small lift of the trail 7 is requisite. The connecting arms can now be brought into alignment, namely in the position wherein they overlap one another. By the disposition of the articular connection 9, 10 between the tractor and the arm 7, the hook 9 or the like must naturally be capable of rotation about the pin 5.

The fastening device (Figs. 1-4) comprises a bow 13 and a screw coupling 15 provided with a hook 14, together with a hand-wheel nut 16. The bow 13 is laid transversely upon the trail 7 and after the hook has been caused to engage with a transverse axle 12 rotatably mounted on the under side of the steering arm 4 and fitted with running wheels 11, the coupling arms 4, 7 are moved towards each other by rotation of the nut 16 (Fig. 2). In this manner the fastening device acts at the same time as lifting device, more particularly for the arm 4, but also for arm 7, till both arms have arrived in approximately one plane and axle 12 and bow 13 rest against the trail 7 (Figs. 1 and 4).

In the connected-up position, the frame-shaped arm 7 lies inside the frame-shaped arm 4 (Fig. 4), the internal width of which is proportional to suit the greatest breadth of the arm 7. In this position of the arms 4, 7, the rigidity thereof and consequently the trustworthy steering of the tractor is assured in certain cases, by the lateral bearing of the arm 7 against the arm 4.

In like manner, the fastening device acts as lowering means for the coupling arm 4. When the trail is disconnected, the wheels 11 act as rear trailing wheels for the tractor, which is thereby capable of being driven independently. For this purpose, the bow 13 is screwed down on the arm 4. One or more transverse rods 21, without wheels, can be fitted to the coupling arm 4, with which rods the hook 14 can engage, when the construction of the trail tail makes this necessary.

The modified construction illustrated in Figs. 5 to 8 has for its object to allow both vehicles, namely, the tractor and the trailer, to shift their positions, and thereby enabling them to travel around curves of small radius. According to this constructional form of the invention, two articular connections are provided, one of which is arranged behind the swivel pin of the steering arm, between the tractor and the coupling arm of the trailer, whilst the second connection is provided between the steering arm of the tractor and the coupling arm of the trailer. One of the two articular connections is constructed so as to enable the coupling arm of the trailer to slide as well as to swivel about it. Figs. 5 to 7 are respectively a side elevation, a plan and a cross section of this modified form of the apparatus. Fig. 8 is a detail showing the transverse rocking of the trailer coupling arm.

The steering and coupling arm 3, 4 (which may be of the first, or as shown, of the second order) of the tractor 2 is adapted to swivel around the vertical pin 5. The well known steering apparatus acts by means of a steering wheel 6 upon the front and shorter arm 3. The tractor has further a rigid arm 17 which extends rearwardly beyond the pivot pin 5 and which carries one element of the articular connection, namely, the latch hook 9 into which the connecting arm of the trailer (for instance the trail 7 of a gun) can be engaged by means of the eye 10.

The rear arm 4 of the steering arm 3, 4 of the tractor is provided at any desired point, preferably near its rear end, with a pivot pin 18 for the coupling arm 7 of the trailer. For this purpose this coupling arm 4 carries a vertical pin 18 which terminates upwardly into a horizontal axle pin 18'. This pin 18' passes through a crosshead or shackle 19 which is removably attached transversely between the two parts of the connecting arm 7, for instance by means of the screw hook 20. As will be perceived, the pivot pin 18 connects likewise the axle 12 of road wheels 11 which serve as supporting wheels to the steering arm 4 when the trailer has been uncoupled.

The manner of operation of the improved apparatus is as follows:—

When the steering wheel 6 is operated, then, owing to the resulting swivelling of the tractor around the vertical pin 5, and owing to the resulting swivelling of the rigid arm 17 (position shown in dot and dash lines in Fig. 6), the trailer arm 7 is caused to swivel around the vertical pin 18, with the result that both vehicles are adjusted simultaneously for travelling around a curve, so that it is possible to travel around a curve of smaller radius than hitherto.

In this connection, owing to the guidance of the crosshead 19 which is removably attached to the connecting arm 7, the horizontal pin 18' allows of an adjustment of the connecting arm 7 in the direction of its length, which adjustment is necessary owing to the shortening between the parts 7, 17 that occurs in the steering movement, where, as shown, the eye 10 is not large enough to allow of this play. This horizontal pin 18' allows also of the trailer taking up inclined positions around its longitudinal axis independently of the tractor when travelling over uneven ground; these inclined positions do not interfere with the hook coupling 9, 10 (see cross section in Fig. 8).

The articular connection 4, 18, 7 may also be constructed as a lifting and lowering apparatus for the connecting arms 4, 7.

What I claim is:—

1. Apparatus for coupling a tractor having a rearwardly extending steering and coupling arm to a trailer having a forwardly extending coupling arm, comprising an articular connection capable of allowing the tractor and trailer to be swivelled relatively to one another at least laterally and a rearwardly arranged fastening device for connecting the two coupling arms together, whereby the tractor and trailer can be connected together by means of the articular connection in any angular position of the coupling arms relatively to one another and then by driving the tractor forward and pulling the trailer after it, the coupling arms can be brought into alinement thus enabling the said fastening device to be readily applied.

2. Apparatus for coupling a tractor to a trailer, comprising in combination a rearwardly extending steering and coupling arm provided on the tractor, a forwardly extending coupling arm provided on the trailer and means for releasably connecting the said coupling arms together at two points, the said means consisting of an articular connection capable of allowing the two arms to be swivelled relatively to one another at least laterally and intended to connect the front end of the arm provided on the trailer to the arm provided on the tractor, and a rearwardly disposed fastening device for connecting the two coupling arms together, whereby the two coupling arms can be connected together by means of the articular connection in any angular position of the coupling arms relatively to one another and then by driving the tractor forward and pulling the trailer after it, the coupling arms can be brought into alinement, thus enabling the fastening device to be readily applied.

3. Apparatus for coupling a tractor to a trailer as set forth in claim 2, in which the fastening device consists of a longitudinally movable screw, a bow and an abutment on the said screw for engaging the two coupling arms and a clamping nut for moving the bow and the abutment relatively to one another for the purpose of raising the two coupling arms and clamping them together.

4. Apparatus for coupling a tractor to a trailer, comprising in combination a rearwardly extending steering and coupling arm pivoted on the tractor, a forwardly extending coupling arm provided on the trailer, an articular connection capable of allowing the tractor and trailer to be swivelled relatively to one another at least laterally, the said articular connection being arranged behind the pivot of the steering and coupling arm, a rearwardly arranged fastening device for connecting the two coupling arms together and a pivot provided on the said fastening device about which pivot the coupling arm of the trailer is capable of swivelling and sliding, whereby in steering the coupled vehicles by swivelling the under-carriage of the tractor about the pivot of the steering and coupling arm, the coupling arm of the trailer will also be swivelled.

5. Apparatus for coupling a tractor to a trailer as set forth in claim 4, in which the pivot provided on the fastening device runs out into a horizontal longitudinal pin, for the purpose set forth.

In testimony whereof I have signed my name to this specification.

OTTO KÖHLER.